US008568582B2

(12) United States Patent
Glatzmaier

(10) Patent No.: US 8,568,582 B2
(45) Date of Patent: Oct. 29, 2013

(54) SYSTEMS AND METHODS FOR SELECTIVE HYDROGEN TRANSPORT AND MEASUREMENT

(75) Inventor: Gregory C. Glatzmaier, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 133 days.

(21) Appl. No.: 13/262,220

(22) PCT Filed: Mar. 31, 2010

(86) PCT No.: PCT/US2010/029477
§ 371 (c)(1),
(2), (4) Date: Sep. 29, 2011

(87) PCT Pub. No.: WO2010/114924
PCT Pub. Date: Oct. 7, 2010

(65) Prior Publication Data
US 2012/0024715 A1    Feb. 2, 2012

Related U.S. Application Data

(60) Provisional application No. 61/165,340, filed on Mar. 31, 2009.

(51) Int. Cl.
C25B 9/00    (2006.01)
C25B 1/02    (2006.01)
C25B 15/02   (2006.01)

(52) U.S. Cl.
USPC ............ 205/637; 205/337; 204/252; 204/415

(58) Field of Classification Search
USPC ................................................ 205/628–639
See application file for complete search history.

(56) References Cited

U.S. PATENT DOCUMENTS

| | | | |
|---|---|---|---|
| 4,306,543 A | 12/1981 | Doevenspeck | |
| 4,332,776 A | 6/1982 | Genequand | |
| 4,452,233 A | 6/1984 | Goodman, Jr. | |
| 4,455,998 A | 6/1984 | Kroontje | |
| 4,508,104 A | 4/1985 | Takeuchi | |
| 4,886,048 A | 12/1989 | Labaton | |
| 4,892,142 A | 1/1990 | Labaton | |
| 6,568,465 B1 * | 5/2003 | Meissner et al. | 165/133 |
| 6,832,608 B2 | 12/2004 | Barkai | |
| 2002/0102445 A1 | 8/2002 | Senner | |
| 2006/0272943 A1 | 12/2006 | Chien | |

OTHER PUBLICATIONS

Song, "Dependence of High-Temperature PEM Fuel Cell Performance on Nafion Content", Journal of Power Sources, 154, 2006, 138-144.

(Continued)

*Primary Examiner* — Nicholas A Smith
*Assistant Examiner* — Brian W Cohen
(74) *Attorney, Agent, or Firm* — Paul J. White; J. Patrick Kendrick

(57) ABSTRACT

Systems and methods for selectively removing hydrogen gas from a hydrogen-containing fluid volume are disclosed. An exemplary system includes a proton exchange membrane (PEM) selectively permeable to hydrogen by exclusively conducting hydrogen ions. The system also includes metal deposited as layers onto opposite sides or faces of the PEM to form a membrane-electrode assembly (MEA), each layer functioning as an electrode so that the MEA functions as an electrochemical cell in which the ionic conductors are hydrogen ions, and the MEA functioning as a hydrogen selective membrane (HSM) when located at the boundary between a hydrogen-containing fluid volume and a second fluid.

11 Claims, 18 Drawing Sheets

(56) References Cited

OTHER PUBLICATIONS

Zhai, "A Novel H3PO4/.Nafion-PBI Composite Membrane for Enhanced Durability of High Temperature PEM Fuel Cells", Journal of Power Sources, 169, 2007, 259-264.

Navarra, "New, High Temperature Superacid Zirconia-Doped Nafion Composite Membranes", J. Mater. Chem., 17, 2007, 3210-3215.

Kwak, "Nafion/Mordenite Hybrid Membrane for High-Temperature Operation of Polymer Electrolyte Membrane Fuel Cell", Solid State Ionics, 160, 2003, 309-315.

Zhai, "Preparation and Characterization of Sulfated Zirconia /Nafion Composite Membranes for PEMFC Operation at High Temperature/ Low Humidity", Journal of Membrane Science, 280, 2006, 148-155.

Ramani, "Investigaton of Nafion/HPA Composite Membranes for High Temperature/Low Relative Humidity PEMFC Operation", Journal of Membrane Science, 232, 2004, 31-44.

Ramani, "Stabilized Heteropolyacid/Nafion Composite Membranes for Elevated Temperature/Low Relative Humidity PEFC Operation", Electrochimica Acta, 50, 2005, 1181-1187.

Zhang, "PEM Fuel Cells Operated at 0% Relative Humidity in the Temperature Range of 23-120 Degrees Celcius", Electrochimica Acta, 52, 2007, 5095-5101.

International Preliminary Report on Patentability and Written Opinion of the International Searching Authority, dated May 19, 2010, for International Application No. PCT/US2010/29477.

International Search Report, dated May 19, 2010, for International Application No. PCT/US2010/29477.

\* cited by examiner

Diphenyl ether

Biphenyl

SYSTEMS AND METHODS FOR SELECTIVE HYDROGEN TRANSPORT AND MEASUREMENT

CROSS-REFERENCE TO RELATED APPLICATIONS

This application claims priority to U.S. Provisional Application No. 61/165,340, filed Mar. 31, 2009, the contents of which are incorporated by reference in their entirety.

Contractual Origin

The United States Government has rights in this invention under Contract No. DE-AC36-08GO28308 between the United States Department of Energy and the Alliance for Sustainable Energy, LLC, the Manager and Operator of the National Renewable Energy Laboratory.

TECHNICAL FIELD

The described subject matter relates to systems and methods for selective hydrogen transport and measurement.

BACKGROUND

Parabolic trough power plants use concentrated solar thermal energy to generate electricity by producing steam that drives a Rankine power cycle. Solar thermal energy for steam generation is initially collected in an organic heat transfer fluid (HTF) as it flows through receiver tubes in the solar collector field. The receiver tube is one component of the heat collection element (HCE) shown in FIG. 1. The tube is positioned within a glass tube of larger diameter. Two metal bellows seal the glass and metal tubes at each end to form an annular volume between the outer surface of the metal tube and the inner surface of the glass tube. The annulus is evacuated during normal operation and thermally insulates the metal receiver tube. In effect, the HCE functions as a thermos to minimize heat loss from the HTF as it flows through the receiver tubes in the solar collector field.

The HTF is typically a eutectic mixture of biphenyl and diphenylether, with a maximum operating temperature of about 393° C. and a vapor pressure at this temperature of about 10 atmospheres. At about 393° C., thermal degradation reactions generate hydrogen gas ($H_2$), which can permeate through the walls of the metal tube and occupy the vacuum-filled annular volume of the HCE. Hydrogen gas with low partial pressure has significant thermal conductivity because of its low molecular weight and correspondingly high molecular velocity. The presence of low partial pressures of hydrogen gas in the annulus significantly decreases the thermal performance of the HCE.

Current methods to prevent build-up of hydrogen gas within the annulus include locating a hydrogen getter in the annulus. The getter consists of a material that adsorbs hydrogen to form a hydride and thereby, removes hydrogen from the annular volume. The limitation of this method is the finite capacity of the getter for hydrogen. Once the getter saturates, it cannot adsorb additional hydrogen allowing the concentration of hydrogen in the annulus to increase.

A second method to remove hydrogen from the annulus is to locate a hydrogen permeable membrane as a barrier between the annular volume and ambient air as shown in FIG. 2. The membrane is most commonly a thin layer of palladium that is selectively permeable to hydrogen. At elevated temperatures, hydrogen permeates through the membrane from the annulus to ambient air where it reacts with oxygen to form water. This method works in principle, but practical implementation may result in failure of the palladium membrane or the glass tube when operating at the design temperature.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Systems and methods are disclosed for selectively removing hydrogen gas from a fluid volume. The volume may contain gas only, gas in equilibrium with liquid, liquid only or supercritical fluid. Exemplary embodiments implement a proton exchange membrane (PEM), such as, e.g., Nafion™. PEMs may be selectively permeable to hydrogen by exclusively conducting hydrogen ions. Palladium metal can be deposited as layers onto opposite sides or faces of the PEM to form a membrane-electrode assembly (MEA). Each palladium layer functions as an electrode. The MEA functions as an electrochemical cell in which the ionic conductors are hydrogen ions. The MEA can function as a hydrogen selective membrane (HSM) when located at the boundary between a hydrogen-containing fluid volume and a second fluid that is typically ambient air. The HSM is positioned such that the first palladium electrode is in contact with the hydrogen-containing fluid volume and the second palladium electrode is in contact with the second fluid. With this arrangement, hydrogen within the hydrogen-containing fluid volume will selectively transport as hydrogen ions from the first palladium electrode, across PEM to the second palladium electrode. The corresponding electrons conduct from the first electrode to the second electrode through an external circuit. At the second electrode, hydrogen ions and electrons recombine to form hydrogen gas or combine with oxygen to form water. The products are transferred to the second fluid by desorption and diffusion. Transport across the HSM is selectively limited to hydrogen. A further function of the HSM is to selectively measure the rate of hydrogen transport across the HSM. This measurement is accomplished by measuring the current through the external circuit of the HSM. Another function of the HSM is to selectively measure the concentration of hydrogen gas within the hydrogen-containing fluid volume. This measurement is accomplished by measuring the open-circuit voltage across the first and second palladium electrodes and correlating this measurement to the hydrogen concentration within the hydrogen-containing fluid volume. Exemplary embodiments have specific utility for removing hydrogen from the annular volume of parabolic trough receivers, from the head-space volume of the heat transfer fluid or from the heat transfer fluid itself.

The HSM is not permeable to molecular gases including hydrogen, oxygen, nitrogen, carbon dioxide, etc. Therefore, the HSM reduces or altogether prevents the transport of gases into or out of the annulus or head space. The ability to conduct hydrogen ions enables the transport of hydrogen exclusively as hydrogen ions from the annulus or head space through the membrane to the second fluid. The process is driven by the electrochemical potential for formation of water from hydrogen and oxygen which is extremely favorable. The potential reduces the hydrogen concentration at the first electrode to very low levels. Since hydrogen reacts with oxygen from air, the device has considerable, if not infinite capacity. The device does not saturate like a getter. Rates of hydrogen removal can be determined by measuring the current through the external circuit. Hydrogen concentration (activity) at the first electrode can be determined by measuring the open-circuit voltage across the first and second electrodes.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Parabolic trough power plants offer an attractive option for near-term, utility-scale, dispatchable, renewable electricity generation. More than 400 megawatts (MW) of capacity currently are in place in the southwest United States. With many more MW of planned installation in the next five years, parabolic trough power will play a major role in providing sustainable power generation in the United States over the next twenty years and later into this century.

Figure 1:
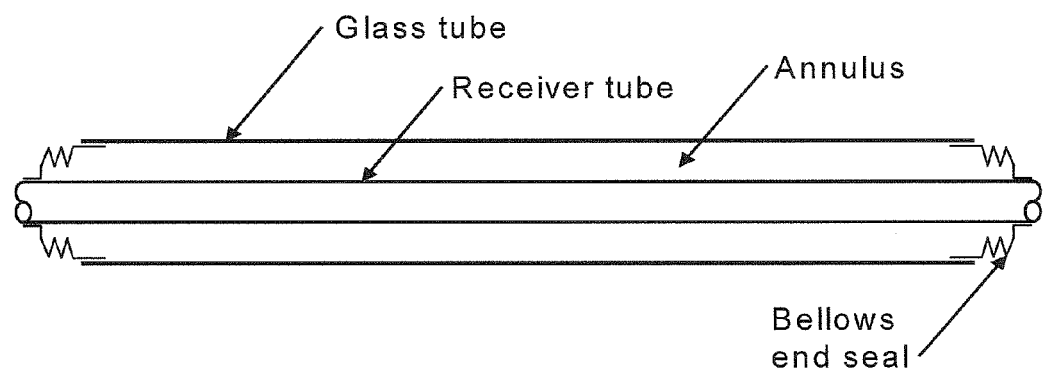
FIG. 1 shows an exemplary HCE.
Figure 2:
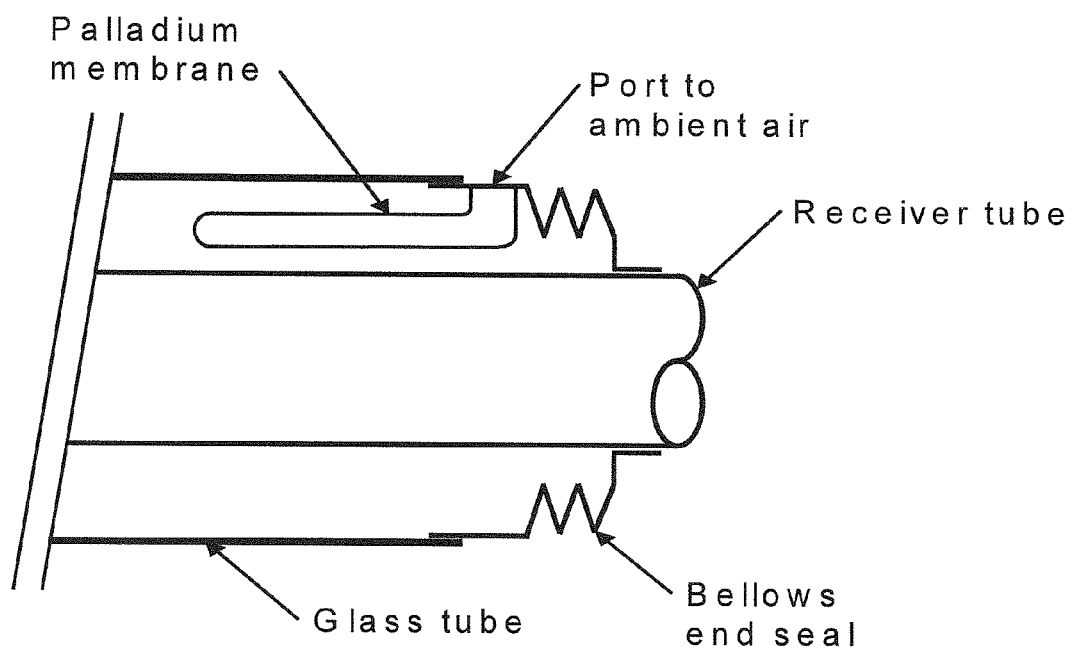
FIG. 2 shows an exemplary palladium membrane as it may be mounted within the HCE.
Figure 3:
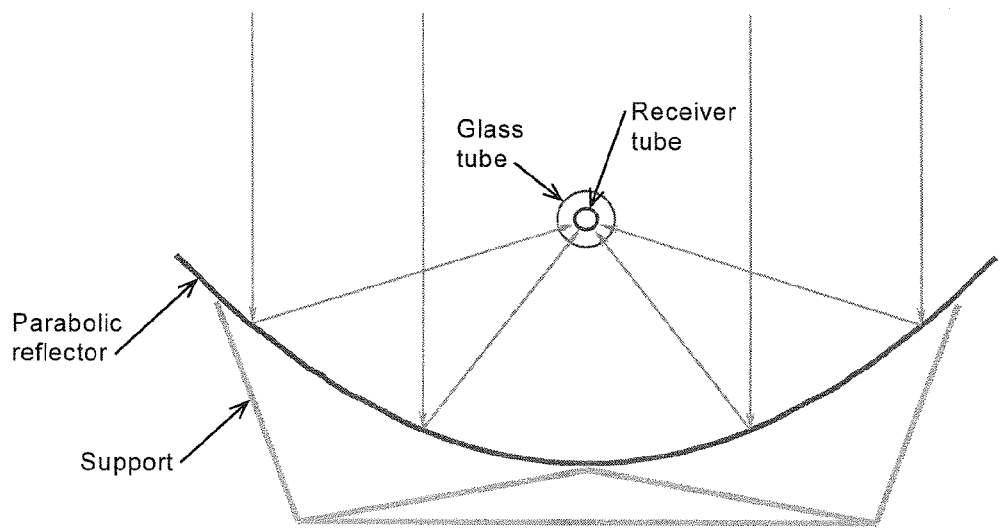
FIG. 3 shows an exemplary parabolic trough design.

Key benefits of parabolic trough power plants are their reliable design and low levelized cost of energy relative to other solar technologies. Power plants are based on the single axis parabolic reflector (FIG. 3), which reflects and concentrates sunlight to a focal line. The concentrated sunlight is absorbed onto a receiver tube within a heat collection element (HCE) and captured into a heat transfer fluid (HTF) that flows through the tube. Thermal energy within the heated HTF is then used to generate steam for Rankine cycle power generation or can be stored for later use.

Figure 4:
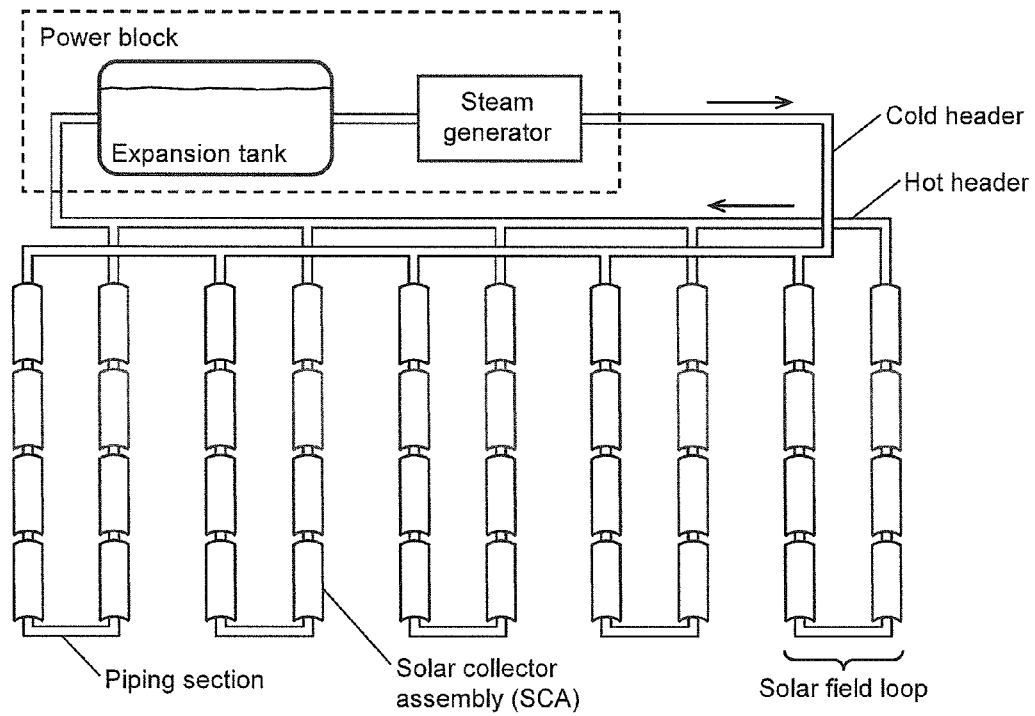
FIG. 4 shows an exemplary plant layout with five solar collector loops.

The HTF within a power plant (FIG. 4) flows through several parallel loops that comprise the solar collector field. Each loop consists of multiple solar collector assemblies (SCAs), which include the parabolic reflector, HCE and accompanying support structure. Piping sections connect the SCAs within each loop. A header supplies HTF from the plant power block to the SCA loops. A second header returns HTF to the power block from the loops. Components within the power block that contain HTF are the steam generator and expansion tank. Flows from the power block to the solar collector field and back comprise a closed loop.

Figure 5:
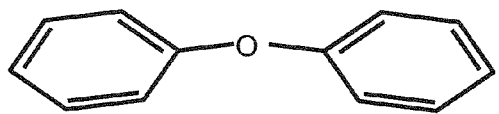
FIG. 5 shows exemplary components of a heat transfer fluid (HTF).
Figure 5:
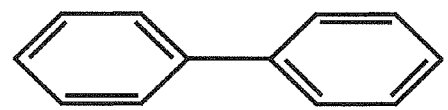

The HTF that is currently used in essentially all of the operating plants is a eutectic mixture of two organic compounds, biphenyl and diphenyl ether (FIG. 5). The fluid is thermally stable to a maximum temperature of 393° C. Its vapor pressure at 393° C. is about 10 atmospheres. Its freezing point is 12° C. These thermal properties allow the heat transfer fluid in parabolic trough power plants to operate with a normal operating temperature range of about 293 to 393° C. Its low freezing point minimizes the risk of freezing in the solar collector field when the plant is off-sun.

Alternate HTFs with higher operating temperatures are being considered for use in future power plants. These fluids will generate higher-temperature steam and will allow the turbine and plant to operate with greater thermodynamic efficiencies. Molten nitrate salt mixtures offer higher operating temperatures with low vapor pressure but their freezing points are typically too high to prevent freezing during off-sun periods. Ternary eutectic mixtures of nitrate salts have recently been discovered that have lower freezing points and may offer a path to a practical molten salt HTF for parabolic trough power plants. Because there currently is no demonstrated alternative HTF, planned near-term installations are being designed to operate with the organic HTF.

Figure 6:
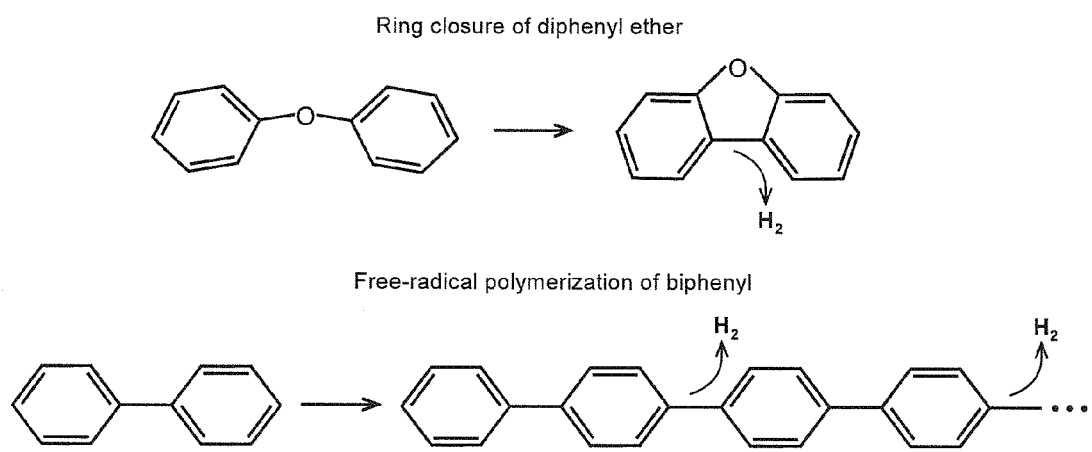
FIG. 6 shows exemplary decomposition reactions.
Figure 7:
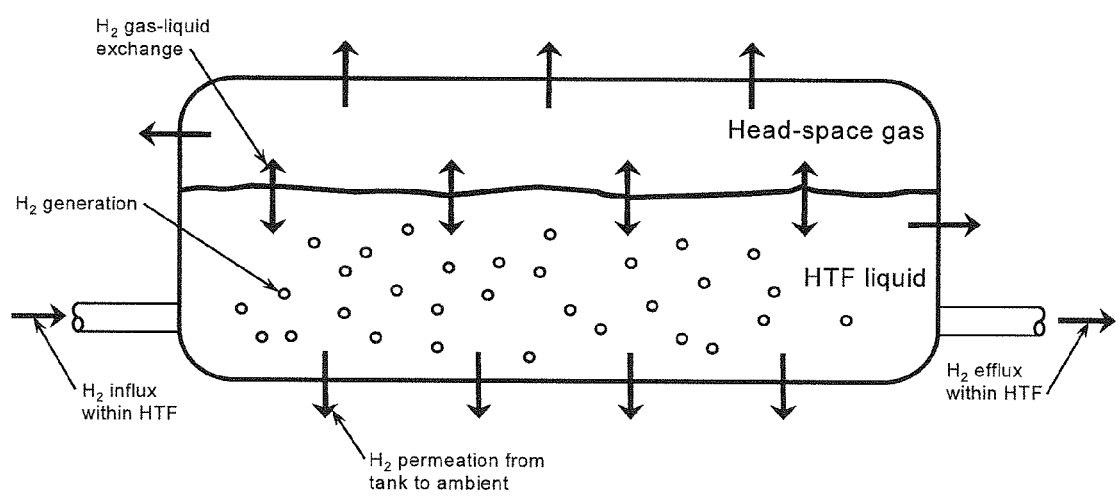
FIG. 7 shows exemplary hydrogen generation and transport in the expansion tank.
Figure 8:
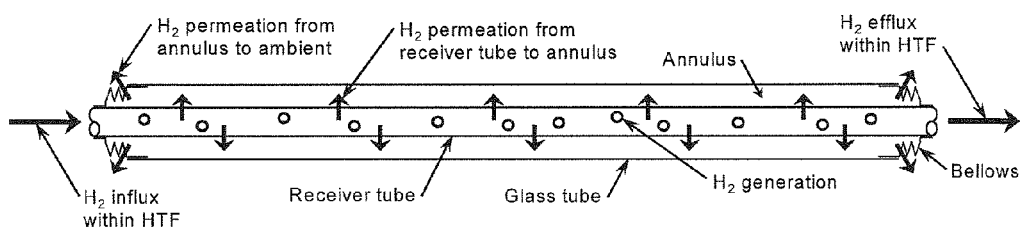
FIG. 8 shows exemplary hydrogen generation and transport in a heat collection element (HCE).

At temperatures near 393° C., the organic components of the HTF undergo a variety of degradation reactions at very slow rates (FIG. 6). These reactions include ring closure of the ether linkage in diphenyl ether and free-radical polymerization of biphenyl to form higher molecular weight products. Both reactions produce hydrogen as a byproduct. The hydrogen is transported throughout the power plant to all components that contain HTF. Its high permeability in metals allows it to permeate through the steel walls of the expansion tank (FIG. 7), steam generator, piping and receiver tubes. All of the hydrogen ultimately passes from the plant to ambient air. Hydrogen that permeates through the HCE receiver tube walls establishes an equilibrium partial pressure within the annular volumes of the HCEs (FIG. 8). The equilibrium partial pressure balances the net permeation rate into the annular volume from the receiver tube with the permeation rate out of the annular volume to ambient air. Permeation out of the annular volume occurs primarily through the metal bellows, which seal the receiver tube to the enclosing glass tube.

The occurrence of hydrogen within the annular volumes of the HCEs results in substantial degradation of the thermal performance of the HCEs. Decreased thermal performance is caused by the relatively high thermal conductivity of hydrogen at low partial pressures of about 1 torr. Hydrogen's high thermal conductivity results from its low molecular weight and high molecular velocity. HCEs that contain hydrogen in their annular volumes retain less of the absorbed thermal energy than those without hydrogen. They operate with lower thermal efficiency and cause a decrease in the overall plant efficiency.

An exemplary system for hydrogen transport or measurement may include a PEM (e.g., Nafion™) membrane that has deposited palladium or platinum electrodes on opposite sides.

Figure 9:
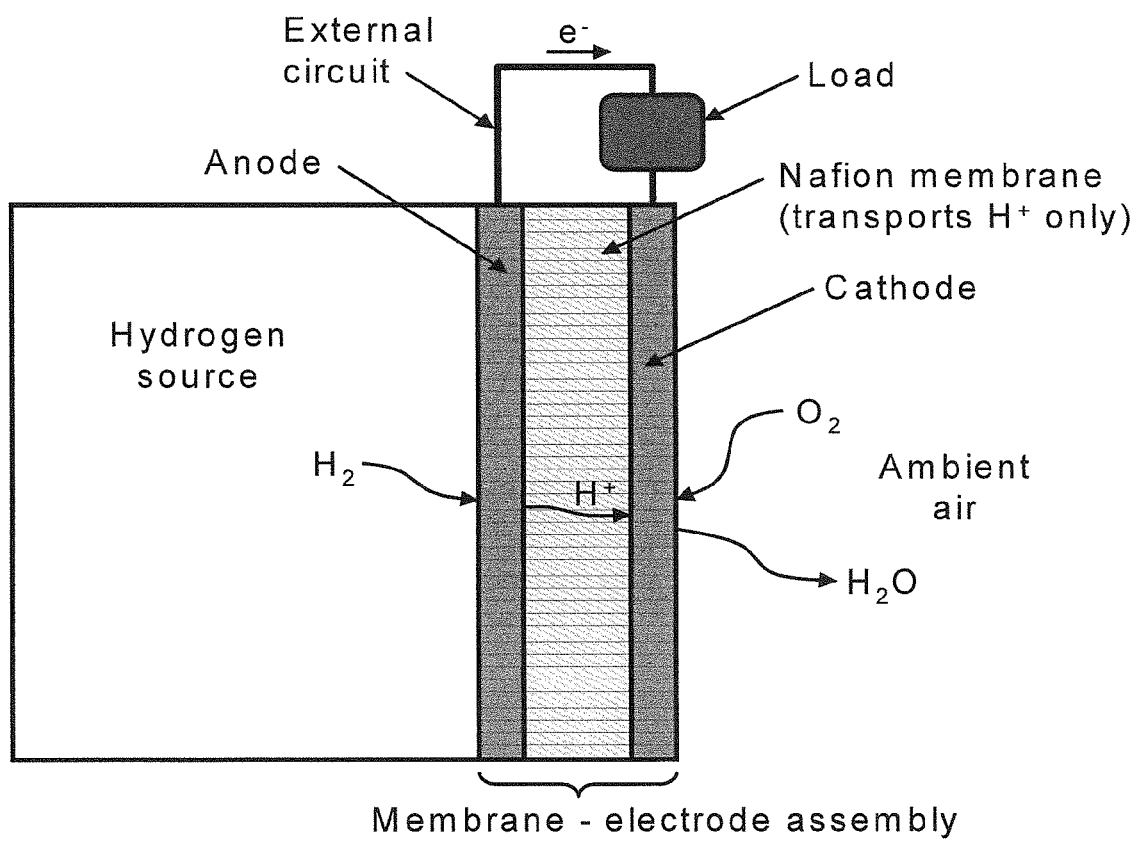
FIG. 9 shows an exemplary membrane-electrode assembly (MEA) as it may be implemented as a hydrogen selective membrane (HSM).

The membrane shown in FIG. 9 is referred to as a membrane-electrode assembly (MEA). The MEA's function in this embodiment is an electrochemical hydrogen selective membrane (HSM). The HSM has several functions. For example, the HSM may function as a selective membrane that exclusively transports hydrogen from one electrode to the other. The HSM may also function as a selective hydrogen monitor that measures the transport rate of hydrogen across the membrane and the concentration of hydrogen at the fluid-electrode interface on the hydrogen-rich side of the HSM.

The PEM may comprise a fluoropolymer substrate with attached sulfonate groups. This polymer material is formed into sheets or films and is impermeable to molecular gases, including hydrogen gas, and is capable of conducting or transporting hydrogen ions ($H^+$) or protons. When coupled with two palladium electrodes, one on each face or side, the membrane functions as an electrochemical cell, as shown in FIG. 9. Hydrogen migrates to the first electrode surface and through the metal electrode to the first electrode-PEM interface. At this point, hydrogen ($H_2$ or H.) ionizes to hydrogen ions ($H^+$) according to the half reactions:

$$H_2 \rightarrow 2H^+ + 2e^- \quad (1)$$

$$H. \rightarrow H^+ + e^- \quad (2)$$

Hydrogen ions migrate through the PEM to the second electrode, which is in contact with the second fluid (typically ambient air). The electrons ($e^-$) pass from the first electrode to the second electrode via an external circuit. At the interface between the PEM and the second electrode, electrons and hydrogen ions combine to reform hydrogen gas or if oxygen is present, they combine with oxygen to form water ($H_2O$). Hydrogen gas or water is transferred from the second electrode to the second fluid by desorption and diffusion. The reaction with oxygen is very strongly favorable and acts to reduce the concentration of hydrogen at the first electrode to very low levels. If oxygen is not present at the second electrode, the transport of hydrogen across the membrane is driven by the hydrogen concentration gradient. A HSM functioning in this manner has considerable (perhaps infinite) capacity to transport and remove hydrogen. This feature gives it a key advantage over the hydrogen getter.

During operation of the HSM, an electrochemical potential (voltage) is generated by the two half reactions. The net voltage that is available in the external circuit of the HSM is the electrochemical potential less the voltage drop within the HSM due to cell overpotentials and internal resistance. If the external circuit that connects the first and second electrodes is shorted, then the only circuit resistances are the HSM internal resistance and cell overpotentials. This condition will increase the current through the HSM. The current can be further increased by applying an additional or supplemental voltage across the first and second electrodes. This applied voltage will increase the internal voltage drop and therefore, the current through the HSM. Application of an external voltage across the first and second electrodes is a means to increase the transport rate of hydrogen through the HSM.

A complementary function of the exemplary system is the ability to measure hydrogen concentration and transport rate across the HSM. Hydrogen gas concentration can be measured within the annulus or head space gas. This measurement may be accomplished by measuring the open-circuit potential or voltage across the two palladium electrodes. The open-circuit voltage gives a direct measurement of hydrogen activity at the first electrode provided the oxygen activity at the second electrode is constant. The measurement may then be calibrated to measure hydrogen concentration in the fluid.

Hydrogen transport rates may also be measured across the membrane barrier by measuring current through the external circuit. The measurement is directly proportional to hydrogen transport across the membrane according to equations 1 & 2. Since the membrane is only active to hydrogen, both measurements are exclusively selective to hydrogen. Either hydrogen measurement or both may be used as an input to a control algorithm to maintain adequate transport of hydrogen from the bulk head space volume or HTF to the first electrode of the HSM. The rate of hydrogen transport across the HSM may be regulated by placing a variable resistance into the external circuit.

Figure 10:
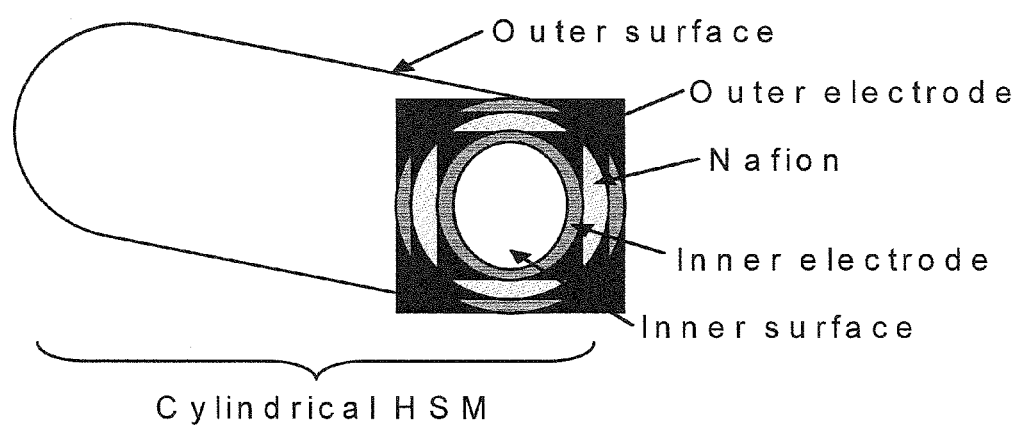
FIGS. 10 & 11 show an exemplary HSM having a cylindrical geometry.
Figure 11:
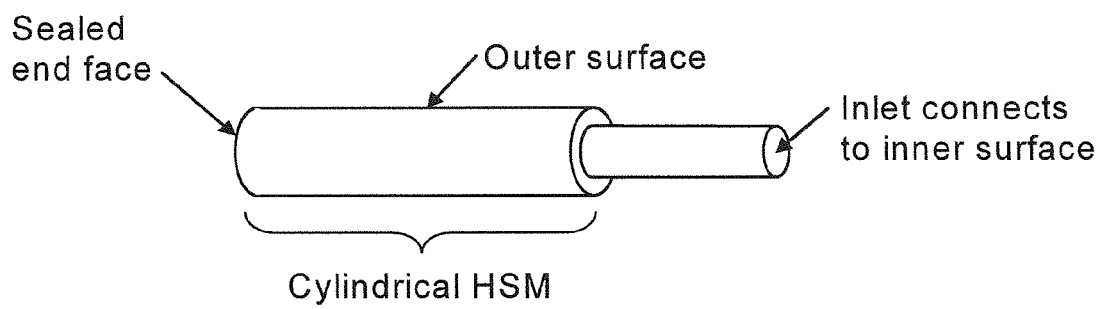

The HSM may be located to remove hydrogen from the HCE annulus or the HTF head space gas or the HTF itself. In these embodiments, there are several possible geometries for the HSM. HSMs can be flat sheets with palladium electrodes deposited on each side or face as shown in FIG. 9. They can also be in a cylindrical geometry in which the electrodes are deposited on the inner and outer cylinder walls, as shown in FIG. 10. For this geometry, the first palladium electrode may be either the inner or outer electrode. If hydrogen contacts the inner surface, then the inner electrode is the first electrode. If hydrogen contacts the outer surface, then the outer electrode is the first electrode. A preferred arrangement maintains the HSM under compression. Porous metal or nonmetal supports may be used to provide structural support to the HSMs. FIG. 11 shows the same cylindrical geometry with one of the end faces sealed to form an internal volume. With this geometry, the outer surface contacts one of the fluids (hydrogen-containing fluid or second fluid) and the inner surface contacts the other fluid through the inlet.

Figure 12:
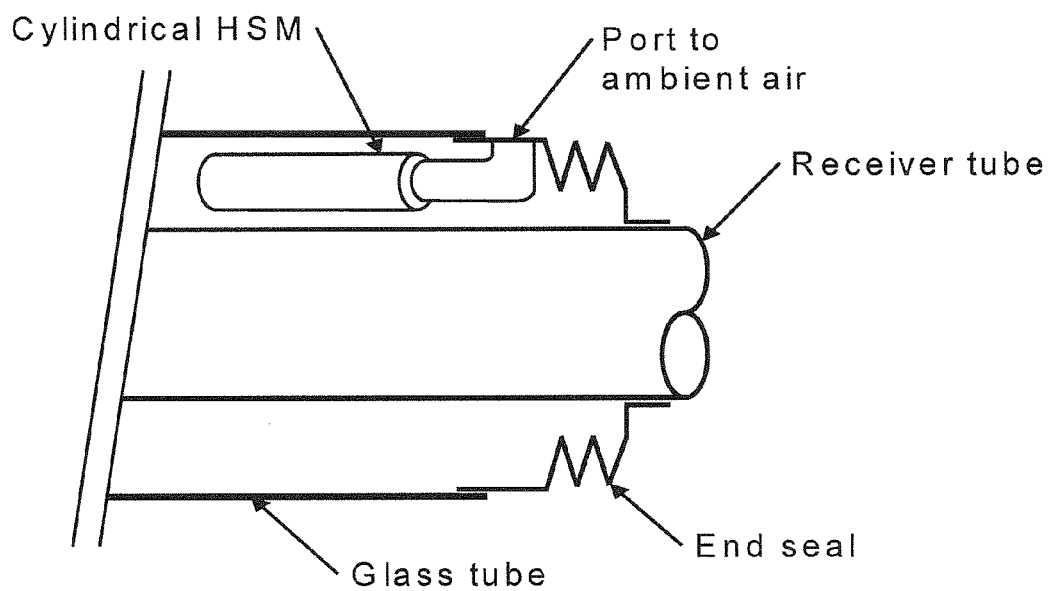
FIG. 12 shows an exemplary HSM as it may be implemented within an HCE.

The HSM may be located at or as part of the boundary between the annulus of an HCE and ambient air. An exemplary configuration is shown in FIG. 12. In this configuration, the HSM functions as a selective membrane allowing only hydrogen to pass from the annulus to ambient air. In FIG. 12, the outer surface contacts the HCE annulus so the outer electrode is the first electrode. The HSM may also be positioned outside the HCE, wherein the inner surface contacts the HCE annulus making the inner electrode the first electrode.

Location of the HSM within the HCE annulus may be difficult because of limited space and because the current maximum operating temperature of the HSM is about 120° C. The HSM may also be located outside the HCE, which reduces the potential for excessive temperature. In either location, heat shielding may be required to maintain proper temperature.

Figure 13:
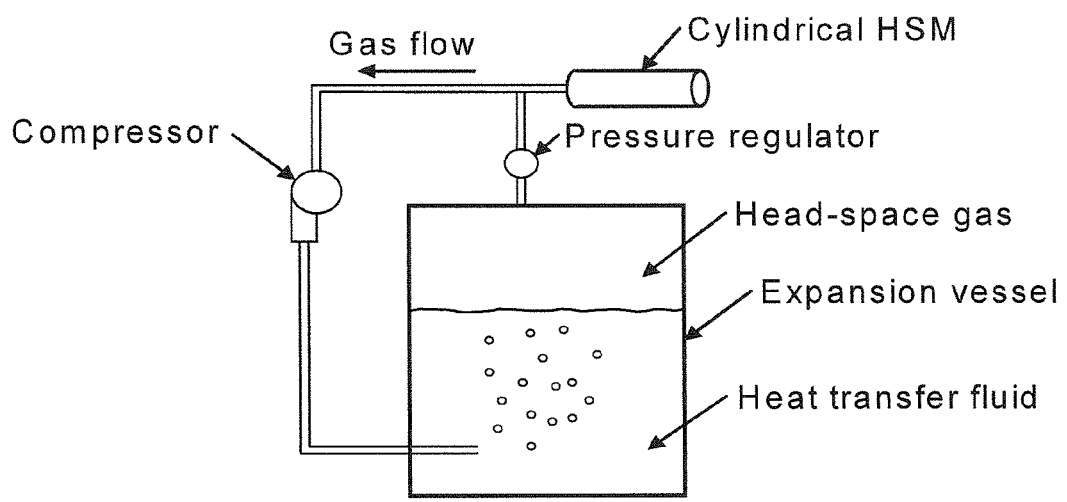
FIGS. 13, 14, 15 & 16 show exemplary HSMs as they may be implemented with an expansion vessel.
Figure 14:
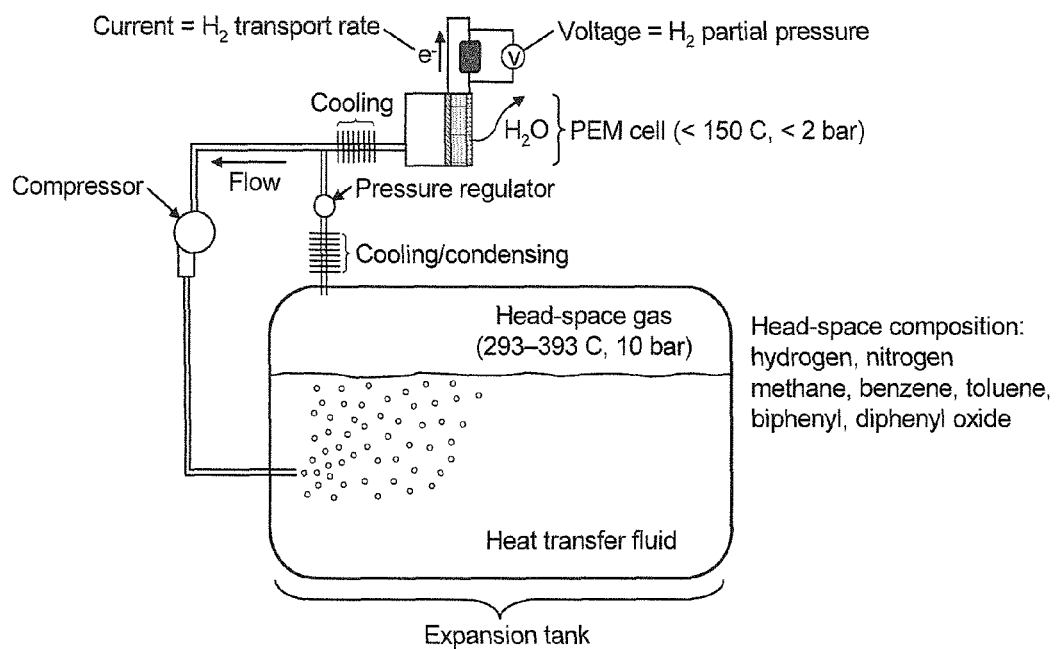

Another location for the HSM in a parabolic trough power plant is in direct or indirect contact with the head space gas that is in equilibrium with the HTF within the HTF expansion vessel, as shown in FIGS. 13, 14, 15 and 16. The head space gas is typically nitrogen along with low molecular weight degradation products including hydrogen, but may also comprise other gases including the HTF components. In these configurations, the inner electrode (first electrode) is in contact with the head space gas. The membrane is impermeable to nitrogen, oxygen, and other degradation products, except hydrogen as hydrogen ions. FIG. 13 shows a configuration that uses a cylindrical HSM geometry. FIG. 14 shows a configuration that uses the flat-plate HSM geometry. In FIG. 14, cooling/condensing steps are included in the gas flow loop to reduce the gas temperature and remove biphenyl, diphenyl ether and other components from the gas stream before it contacts the HSM.

Figure 15:
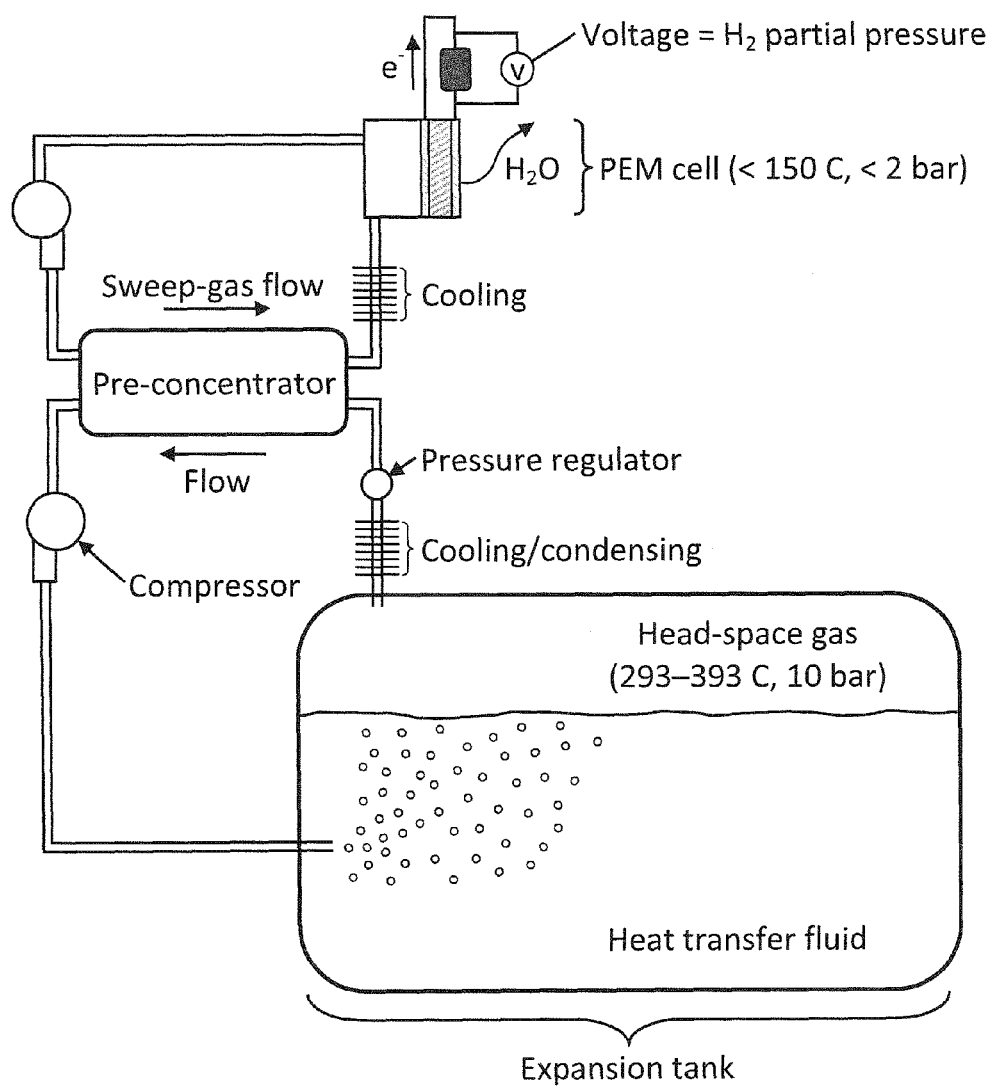

In FIG. 15, a hydrogen pre-concentration step is incorporated in the embodiment. This step serves to isolate hydrogen from the other components within the gas stream and also increase the hydrogen concentration at the first electrode of the HSM. The pre-concentration step may be accomplished by any of several methods known in the art. Examples include selectively adsorbing hydrogen from the head-space gas steam onto a suitable sorbent material at low temperature and then heating the sorbent material to desorb the hydrogen into a gas sweep stream. Hydrogen in the gas sweep stream is sent to the first electrode of the HSM.

Figure 16:
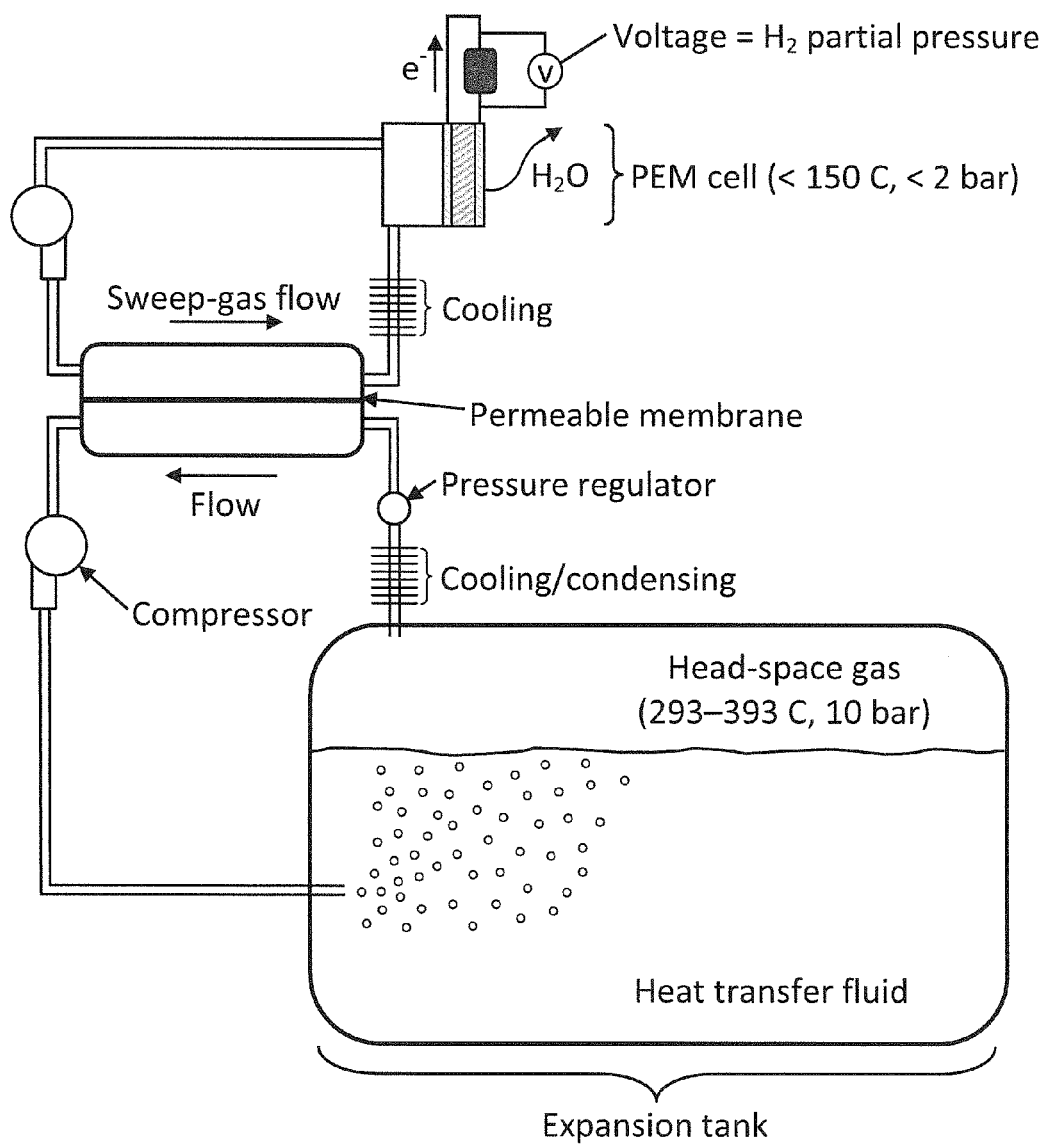

In FIG. 16, a hydrogen selective membrane is used to selectively transfer hydrogen from the head-space gas stream to a sweep gas steam before it is sent to the first electrode of the HSM. The membrane may comprise any of several materials that are known to be selectively permeable to hydrogen including palladium, tantalum, vanadium or iron. Any suitable membrane geometry may be used including the geometries typically used in counter-flow heat exchangers. In the present invention, the surfaces within the heat exchanger that are normally used for heat transfer from one fluid to a second would be designed and used for the transport of hydrogen from one fluid to a second. The embodiment shown in FIG. 16 includes the variation in which the liquid HTF directly contacts one surface of the membrane and hydrogen gas permeates from the liquid HTF across the membrane to a sweep gas. In this variation, the membrane could be submersed into the HTF liquid.

Figure 17:
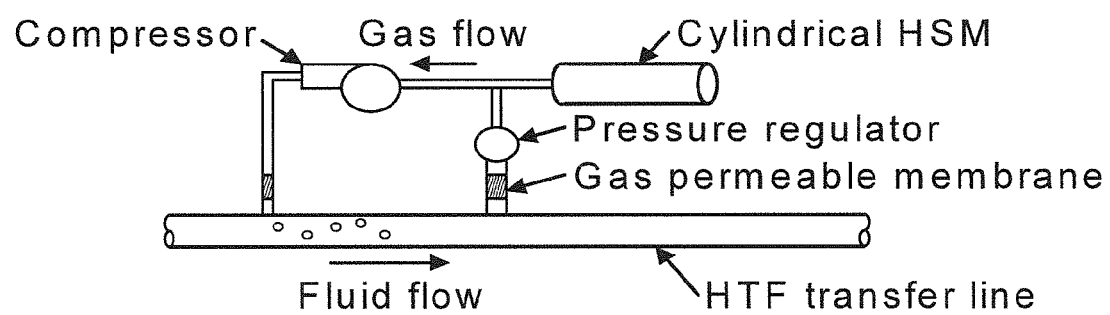
FIGS. 17 & 18 show exemplary HSMs as they may be implemented with a transfer line or piping section.
Figure 18:
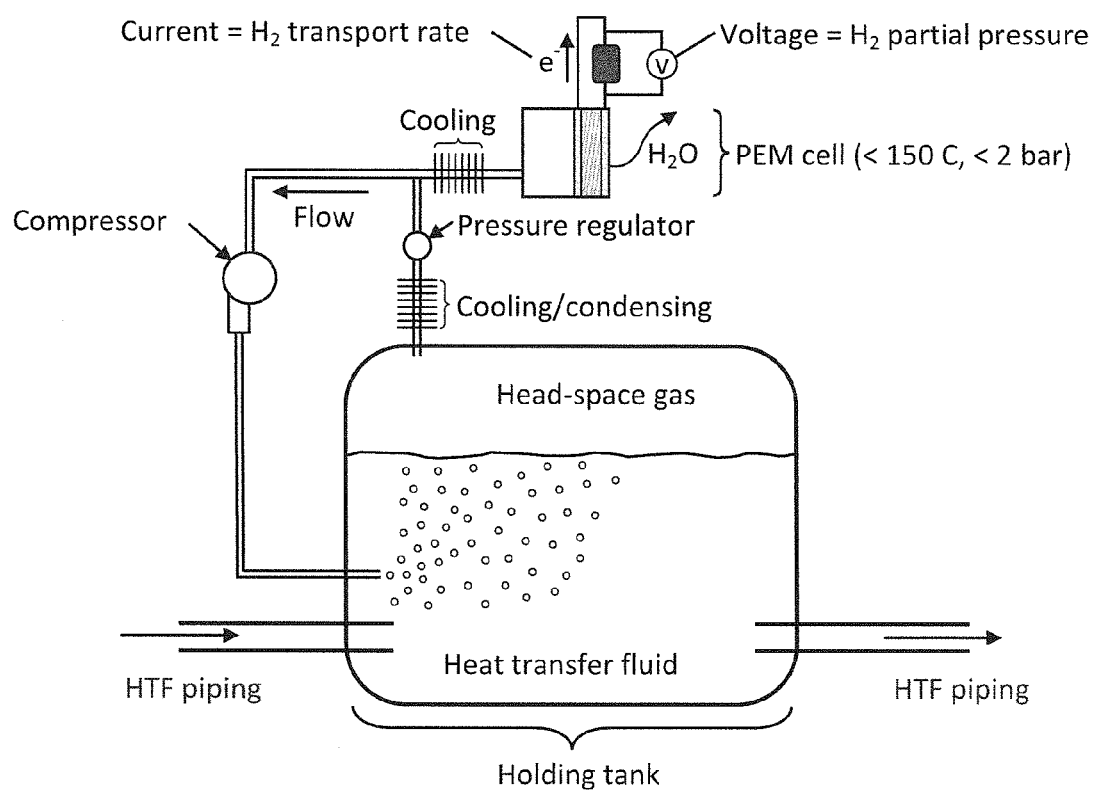

The HSM may also be located in close proximity to the HTF at locations along the HTF transfer lines in the solar field, as shown in FIGS. 17 & 18. For this location, a gas-permeable membrane may be used to reduce or altogether prevent direct contact of the HTF with the HSM (FIG. 17). In FIG. 18, a holding tank is placed in-line with the transfer line (piping and header sections) to create a suitable holding or residence time for the HTF to allow for purging of the hydrogen gas into the head space. Any of the embodiments shown in FIGS. 13-16 may be used with the holding tank. The holding tank may also be placed in the HTF piping that immediately exits the expansion tank.

If the HSM is used to remove hydrogen from the head space gas or the HTF, exposure to excessive temperature is not as likely. The HSM can be positioned at a distance from the expansion vessel or transfer line that is sufficient to maintain its temperature within acceptable limits. One issue specific to this use is the high pressure of the head space gas. The HTF is maintained at about 10 atmospheres (or about 132 psig) to prevent excessive vaporization. The current HSM structures have a maximum operating pressure drop of 25 psi. To address this issue, a pressure regulating valve may be located between the expansion vessel or transfer line and the HSM. Exemplary configurations are shown in FIGS. 13-18. In these configurations, a compressor is used to cause a flow of head space gas through a closed loop and to the HTF in a manner that provides adequate gas purging of the HTF. This process aids in the transfer of hydrogen from the HTF to the head space gas. The compressor also brings a continuous flow of head space gas past the HSM which aids in the removal of hydrogen. The pressure regulator maintains the pressure of the head space gas at the HSM at a value that sets the pressure drop across the HSM to an acceptable level. FIGS. 14 & 18 include means for cooling and condensing the head-space gas as it exits the expansion vessel and as it flows towards the HSM.

For the configurations shown in FIGS. 13-18, other flow-regulating components (e.g., check valves or pressure-relief valves) may also be employed to properly control the flow of gas through the loop(s).

The PEM is initially hydrated and maintains a proportion of water content to function properly. In either application, other components may be employed to maintain the membrane's hydration level. For example, membranes are commercially available which operate in low humidity and in 0% or near 0% relative humidity. Also, steps may be implemented to reduce or altogether prevent the PEM from freezing.

FIG. 16 is an example of several possible embodiments in which a metal or metal alloy membrane is used to selectively remove hydrogen from the head-space gas or the HTF. Accordingly, the membrane in this embodiment may be used by itself to remove hydrogen from the head-space gas or the HTF. In this case, an HSM is not used and the hydrogen is vented to ambient air or otherwise captured.

Permeable membranes may comprise palladium or a palladium alloy, and may be about 0.010 inches thick. Considering the increasing costs of noble metals, a permeable membrane which is sized to remove hydrogen from the head-space gas and is composed exclusively of palladium may be expensive. A more practical and less expensive approach may be to use a membrane that has a layer of palladium deposited onto a porous metallic or nonmetallic structural substrate. This approach may reduce the quantity of palladium for the device and thereby reduce its cost.

FIGS. 13-18 show embodiments that illustrate the use of the invention to remove hydrogen from the HTF that is circulating within a solar parabolic trough power plant. There are many other uses for this invention that expand its application beyond the parabolic trough technology. For example, there are applications within the chemical and petrochemical process industries wherein there are needs to remove hydrogen selectively from fluids that are contained within process vessels or flowing within process lines. All of the embodiments described herein or variations thereof may be implemented for those applications.

It is noted that the examples discussed above are provided for purposes of illustration and is not intended to be limiting. Still other embodiments and modifications are also contemplated.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A method for selectively removing hydrogen gas from a hydrogen-containing fluid volume, comprising:
   providing a proton exchange membrane (PEM) selectively permeable to hydrogen by exclusively conducting hydrogen ions;
   providing metal deposited as layers onto opposite sides or faces of the PEM to form a membrane-electrode assembly (MEA), each layer functioning as an electrode so that the MEA functions as an electrochemical cell in which the ionic conductors are hydrogen ions, and the MEA functioning as a hydrogen selective membrane (HSM) when located at the boundary between a hydrogen-containing fluid volume and a second fluid; and
   using the MEA to remove hydrogen in a solar parabolic trough power plant by removing hydrogen from a heat transfer fluid that is circulating in the solar parabolic power plant, from an annular volume of a parabolic trough receiver, from a head-space volume of a liquid-phase heat transfer fluid, or from a liquid-phase heat transfer fluid in a transfer line.

2. The method of claim 1, further comprising selectively measuring the rate of hydrogen transport across the HSM.

3. The method of claim 2, further comprising measuring current through the external circuit of the HSM.

4. The method of claim 1, further comprising selectively measuring concentration of hydrogen gas within the hydrogen-containing fluid volume.

5. The method of claim 4, wherein the measurement is accomplished by measuring open-circuit voltage across the first and second electrodes and correlating the voltage to hydrogen concentration within the hydrogen-containing fluid volume.

6. The method of claim 1, further comprising positioning the HSM so that the first electrode is in contact with the hydrogen-containing fluid volume and the second electrode is in contact with the second fluid so that hydrogen within the hydrogen-containing fluid volume selectively transports hydrogen ions from the first electrode, across the PEM to the second electrode.

7. The method of claim 1, further comprising conducting electrons from the first electrode to the second electrode through an external circuit.

8. The method of claim 1, further comprising combining hydrogen ions and electrons at the second electrode to form hydrogen gas or combining hydrogen ions and electrons at the second electrode with oxygen to form water, which is transferred to the second fluid by desorption and diffusion.

9. The method of claim 8, wherein transport across the HSM is selectively limited to hydrogen.

10. The method of claim 1, further comprising removing hydrogen from fluids within process flow streams or from fluids within process vessels.

11. The method of claim 1, further comprising ambient air as the second fluid.

* * * * *